United States Patent [19]

Iwata et al.

[11] Patent Number: 4,989,885
[45] Date of Patent: Feb. 5, 1991

[54] MAGNETIC FLUID RETAINER, AND SHAFT SEALER EMPLOYING SAME

[75] Inventors: Masao Iwata, Chichibu; Kiyoshi Eguchi, Kumagaya; Kenichi Mouri, Ohmiya; Hiroshi Tsuchida, Kumagaya, all of Japan

[73] Assignee: Hitachi Metals, Ltd., Tokyo, Japan

[21] Appl. No.: 484,472

[22] Filed: Feb. 22, 1990

Related U.S. Application Data

[63] Continuation of Ser. No. 288,823, Dec. 23, 1988, abandoned.

[51] Int. Cl.$^5$ .............................................. F16J 15/40
[52] U.S. Cl. ...................................... 277/80; 277/135
[58] Field of Search ................................. 277/80, 135

[56] References Cited

U.S. PATENT DOCUMENTS

| | | | |
|---|---|---|---|
| 3,700,248 | 10/1972 | Teske et al. | 277/80 |
| 4,357,021 | 11/1982 | Raj et al. | 277/135 X |
| 4,357,023 | 11/1982 | Yamamura | 277/135 X |
| 4,526,379 | 7/1985 | Raj | 277/80 |
| 4,526,382 | 7/1985 | Raj et al. | 277/80 |
| 4,531,846 | 7/1985 | Raj | 277/80 X |
| 4,575,102 | 3/1986 | Raj et al. | 277/80 |

FOREIGN PATENT DOCUMENTS

| | | | |
|---|---|---|---|
| 1119965 | 6/1956 | France | 277/80 |
| 246577 | 10/1988 | Japan | 277/80 |

*Primary Examiner*—Allan N. Shoap
*Attorney, Agent, or Firm*—Finnegan, Henderson, Farabow, Garrett & Dunner

[57] ABSTRACT

Apparatus for sealing a magnetic shaft includes a magnetic housing having a throughbore with a stepped enlargement at one end, a pair of annular disk-shaped yokes spaced apart by an axially magnetized permanent magnet positioned in the stepped enlargement and surrounding the shaft, and magnetic fluid in the gaps between the yokes and the shaft. The outside diameter of one yoke is spaced from the magnetic housing and is smaller than the outside diameter of the other yoke, while the larger yoke abuts the magnetic housing at its outside diameter. A plastic, non-magnetic member can separate the smaller diameter yoke from the magnetic housing.

1 Claim, 7 Drawing Sheets

MAGNETIC FLUID RETAINER, AND SHAFT SEALER EMPLOYING SAME

This application is a continuation of application Ser. No. 288,823, filed Dec. 23, 1988, now abandoned.

DETAILED DESCRIPTION OF THE INVENTION

Background of the Invention

1. Field of the Invention

This invention relates to a shaft sealer which seals a shaft hole by retaining a magnetic fluid between a magnetic shaft and a magnetic fluid retainer located around the circumference of the shaft, and more particularly to a shaft sealer employing a magnetic fluid retainer which is improved in construction to utilize the flux of the magnetic circuit effectively for retention of the magnetic fluid.

2. Description of Background

Shaft sealers using a magnetic fluid are increasingly used in various fields including the fields of vacuum devices and magnetic disk drives. For instance, as shown in FIG. 3, a shaft sealer using a magnetic fluid includes a housing 4 having a shaft hole 2 of a diameter sufficiently larger than the outer diameter of a magnetic shaft 1 and a stepped portion 3 formed at least at one end of the shaft hole 2 and an inner periphery of a diameter larger than that of the shaft hole 2, and a magnetic fluid retaining member 7 fittingly mounted in the stepped portion 3 of the housing 4 with a non-magnetic member 6. A magnetic fluid 8 is retained in the gap space between the rotational shaft 1 and the magnetic fluid retaining member 7 to form a seal around the circumference of the rotational shaft 1. Recently special attention is paid to the seal which is maintained by the magnetic fluid in this manner because the seal can be maintained free of the problem of friction as experienced with the ordinary solid seal members.

In case of the conventional shaft sealer as described above, however, the magnetic fluid retaining member 7 normally has a pair of annular magnetic yokes 7b of the same outer diameter securely fixed to the axially opposite sides of an annular magnet 7a to generate a magnetic field for retaining the magnetic fluid in the gap space which is formed between the magnetic fluid retaining member 7 and the magnetic shaft 1. The magnetic flux which is produced by the magnet mainly takes the path of magnet 7a—one yoke 7b—one gap portion—rotational shaft 1—the other gap portion—the other yoke 7b—magnet 7a, acting effectively for the retention of the magnetic fluid.

In the retaining member shown in FIG. 3, a nonmagnetic member 6 of a synthetic resin material or the like is interposed between the annular magnetic fluid retaining member 7 and the axial bottom surface 3a and the inner peripheral surface 3b of the stepped portion 3 in the housing 4. In a case where the housing 4 is formed of a magnetic material, this arrangement is essential to prevent leaks of the magnetic flux to the housing 4 from the outer periphery of the magnetic fluid retaining member 7.

In a case where the non-magnetic member 6 of a thickness suitable for forming a magnetically sufficient gap space is absent, it becomes difficult to prevent the leaks of the magnetic flux from the yokes to a sufficient degree, resulting in weakening of the magnetic force at the inner periphery of the shaft hole 5 of the retaining member 7 as well as weakening of the force for retaining the magnetic fluid 8, making it difficult to realize a practically useful magnetic fluid seal. In addition, the magnetic flux which passes through the magnetic housing has possibilities of imposing adverse effects on other devices, for example, causing errors to a recording medium of a magnetic disk drive.

Nevertheless, it is not desirable to locate the non-magnetic member hermetically between the magnetic fluid retaining member and the housing since it increases the number of parts and is therefore disadvantageous from the standpoint of industrial fabrication of the shaft sealers. The plastics or a relatively soft material which is normally used for the non-magnetic member involves the problem of eccentricity in the assembling process of the magnetic fluid retaining member. For example, when assembling a shaft sealer using a magnetic fluid, if the gap space between the magnetic fluid retaining member and the shaft is not uniform, the magnetic field is weakened at a broader gap portion than at a narrower gap portion, resulting in uneven magnetic fluid retention force and lowered pressure resistance.

SUMMARY OF THE INVENTION

With the foregoing in view, the present invention has as its object the provision of a shaft sealer using a magnetic fluid, which is constructed in such a manner as to utilize more effectively the magnetic force of the magnetic fluid retaining member. It is also an object of the invention to provide a shaft sealer of the sort mentioned above, which is easy to manufacture.

According to the invention, there is provided a magnetic fluid retainer, comprising: at least one pair of yokes each having a shaft hole for passing therethrough a magnetic shaft; and an axially magnetized permanent magnet having a hole of a diameter slightly larger than the shaft hole in the yokes and gripped between the yokes substantially in concentric relation therewith; one of the yokes having an outer diameter smaller than that of the other yoke.

According to another aspect of the invention, there is provided a shaft sealer, comprising: a magnetic housing having a stepped portion at least at one end of a shaft receiving hole of a diameter sufficiently larger than the outer diameter of a shaft to be fitted therein; a magnetic fluid retainer having a shaft hole for passing therethrough a magnetic shaft and fittingly mounted in the stepped portion of the housing; and a magnetic fluid retained between the shaft and the magnetic fluid retainer; the magnetic fluid retainer being constituted by at least one pair of yokes and a magnet gripped between the yokes, one of the yokes having a smaller outer diameter than the other to form a broader gap space between the yoke of the smaller outer diameter and the inner periphery of the stepped portion of the housing than between the yoke of the greater outer diameter and the stepped portion of the housing.

According to the present invention, by the use of a magnet with an outer diameter smaller than the yoke of the larger outer diameter and greater than the yoke of the smaller outer diameter, it becomes possible to realize a magnetic fluid retainer with more preferable characteristics and a shaft sealer incorporating such magnetic fluid retainer.

DESCRIPTION OF THE PREFERRED EMBODIMENTS

The magnetic fluid retainer according to the present invention is formed by fixing magnetic yokes to the axially opposite end faces of a magnet, one of the yokes being formed in a smaller outer diameter than the other yoke to provide a magnetic gap between the circumferential surface of the smaller yoke and the inner periphery of the stepped portion of the housing of magnetic material.

In the present invention, even a magnetic gap smaller than 0.1 mm is useful if the magnetic reluctance can be increased to a substantial degree. However, in order to secure a sufficient magnetic reluctance stably in consideration of the problem of machining accuracy it is preferred that the afore-mentioned magnetic gap be greater than 0.2 mm, more preferably, greater than 0.5 mm to ensure a sufficient magnetic reluctance practically free of problems. Further, in the present invention, the outer diameter of the magnet which is gripped between the yokes can be arbitrarily selected from the range between the outer diameters of the larger and smaller yokes. A magnet with a larger outer diameter (a larger volume) can produce a stronger magnetic field in the gap formed between the yokes and the rotational shaft, but on the other hand a magnet with a smaller outer diameter has an advantage that the magnetic fluid retainer can be constructed in a smaller and more compact form to provide a shaft sealer of reduced size and weight.

In the magnetic fluid shaft sealer the invention, one of the yokes which constitute the magnetic fluid retainer is smaller than the other yoke in outer diameter to provide a gap of a certain breadth between its outer periphery and the inner periphery of the magnetic housing, so that, as compared with the primary magnetic circuit at the inner periphery of the magnet (the primary path for sealing the shaft with the magnetic fluid, i.e., the path of the magnet—one yoke (the smaller yoke)—one gap portion—the rotational shaft—the other gap portion—the other yoke (the larger yoke)—the magnet), the reluctance of the magnetic circuit at the outer periphery of the magnet (the path of the magnet—the smaller yoke (one yoke)—the magnetic gap—the magnetic housing—the larger yoke (the other yoke) the magnet) becomes greater to suppress leaks of the magnetic flux. Accordingly, the magnetic force of the magnetic fluid retainer is strengthened at the magnetic fluid retaining portion (in the gap portion formed between the inner peripheral surfaces of the shaft holes in the yokes and the rotational shaft), without giving adverse effects on other neighboring devices by suppression of the magnetic flux leaks through the magnetic housing.

Hereafter, the invention is described more particularly with examples.

EXAMPLE 1

Figure 1:
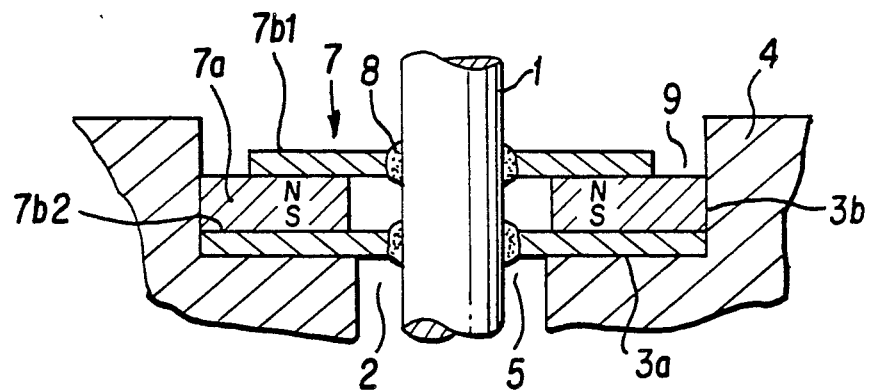
FIG. 1 is a fragmentary sectional view of major components of a shaft sealer according to the invention.

Referring to FIG. 1, there is shown in a fragmentary sectional view an embodiment of the shaft sealer according to the present invention, wherein indicated at 1 is a rotational shaft of a magnetic material which shaft is fitted in a through hole 2 of a housing 4 of magnetic material with a stepped portion 3 at one end of the through hole 2. Fitted in the stepped portion 3 is a magnetic fluid retainer 7 which is constituted by a pair of yokes $7b_1$ and $7b_2$ each with a shaft hole 5 for passing therethrough the shaft 1 and a magnet 7a which is fixedly gripped between the yokes $7b_1$ and $7b_2$. The magnet 7a is provided with a hole of a diameter larger than the shaft holes in the yokes, positioned substantially in concentric relation with the yokes, and magnetized in the axial direction.

Of the above-mentioned paired yokes, one yoke $7b_1$ is formed to have a smaller outer diameter than the other yoke $7b_2$ which is abuttingly secured to the bottom surface 3a and inner peripheral surface 3b of the stepped portion 3. A magnetic fluid 8 is retained between the rotational shaft 1 and the inner peripheral surfaces of the shaft holes in the respective yokes of the magnetic fluid retainer 7. On the other hand, a magnetic gap 9 is substantially formed between the circumferential surface of the yoke $7b_1$ of the smaller outer diameter and the inner peripheral surface 3b of the stepped portion 3 to have a large reluctance thereacross. Accordingly, as compared with the primary magnetic circuit which acts on the magnetic fluid for the shaft sealing, namely, the path of the magnet 7a—the smaller yoke $7b_1$—the gap portion—the rotational shaft 1—the gap portion—the larger yoke $7b_2$—the magnet 7a, the reluctance is increased with regard to the magnetic circuit of the magnet 7a—the smaller yoke $7b_1$—the magnetic gap 9—the magnetic housing 4—the large yoke $7b_2$—the magnet 7a, relatively suppressing the leaks of the magnetic flux to increase the magnetic force at the magnetic fluid retaining portions for higher shaft sealing effects.

Since the magnet 7a is magnetized in an axial direction (thickness direction), magnetic flux from the magnet 7a is emitted perpendicularly from the end surface of the magnet and comes to the yoke or housing. Accordingly, although the outside diameter of the magnet 7a is shown to be almost the same as the outside diameter of the larger yoke $7b_2$ in FIG. 1, the outer diameter of the magnet 7a may be the same as the outside diameter of the smaller yoke to cause the similar advantage of magnetic gap between the housing and the smaller yoke.

Annular ferrite bonded magnets with dimensions of 16.5 mm in outer diameter, 9.4 mm in inner diameter and 0.6 mm in thickness were prepared to serve as the magnet 7a. As the yoke $7b_2$ of larger outer diameter, annular yoke plates with dimensions of 16.5 mm in outer diameter, 8.4 mm in inner diameter and 0.2 mm in thickness were prepared from magnetic stainless steel. Further, as the yoke $7b_1$ of the smaller outer diameter, three kinds of yoke plates with outer diameters as shown in Table 1 below, an inner diameter of 8.4 mm and a thickness of 0.2 mm were prepared from magnetic stainless steel.

TABLE 1

| Status | Specimen No. | Outer Diam. of Smaller Yoke (mm) | Pressure resistance (mm H$_2$O) | |
|---|---|---|---|---|
| | | | Mounted in Non-magnetic Housing | Mounted in magnetic Housing |
| Comparative Example | 1 | 16.5 | 242 | 65 |
| Invention | 2 | 15.5 | 203 | 190 |
| | 3 | 14.5 | 145 | 252 |
| | 4 | 13.5 | 102 | 140 |

Then the respective yokes were adhered to the opposite sides of each one of the above-mentioned bonded magnet concentrically by the use of a cyanoacrylate-base adhesive to prepare the specimens No. 2 to 4 of the magnetic fluid retainer according to the invention.

Each one of these magnetic fluid retainers was fitted on a 8 mm shaft of magnetic material and mounted in a housing of a magnetic material. Thereafter, 7.5 microliters of a magnetic fluid was injected to and retained in the gap space between the magnetic fluid retainer and the shaft to form a shaft sealer of the construction as shown in FIG. 1. The results of measurement of pressure resistances of the respective magnetic fluid retainers are shown in Table 1. The pressure resistance indicates the value of the pressure (the maximum pressure) immediately before an abrupt pressure drop caused by erruption of the magnetic fluid seal in a sealed vessel which was pressurized at a speed of 50 mmH$_2$O/min by air injection.

For the purpose of comparison, measurements were also made of the pressure resistances of the above-described magnetic fluid retainers which were mounted on non-magnetic housings, as shown in Table 1. Further, as a Comparative Example, a magnetic fluid retainer with yokes of same outer diameters (Specimen No. 1) was studied, obtaining results as shown also in Table 1.

As clear from Table 1, the magnetic fluid retainers according to the invention show a higher pressure resistance when mounted on a magnetic housing rather than on a non-magnetic housing.

It is also seen therefrom that, when the magnetic fluid retainer of the invention is mounted on a magnetic housing with appropriate designing (e.g., Specimen No. 3), it exhibits superior characteristics in pressure resistance (252mmH$_2$O) as compared with the conventional counterpart, namely, the pressure resistance (242mmH$_2$O) of the Comparative Example. This is considered that, in the magnetic fluid retainer of the invention, the existence of a gap of a width greater than 0.5 mm between the yokes and the housing increases the reluctance at that part even when it is mounted on a magnetic housing, suppressing the magnetic flux portion which otherwise tends to return through the housing. As a result, it becomes possible to increase relatively the amount of the magnetic flux to the magnetic fluid retaining gap portions between the shaft and the fluid retainer.

On the other hand, the magnetic fluid retainer with yokes of same outer diameters (Specimen No. 1), which is given as Comparative Example, exhibits a high pressure resistance when mounted on a non-magnetic housing. However, when mounted on a magnetic housing, its pressure resistance drops considerably to a level which is unacceptable for practical applications. This is considered to be attributable to a marked reduction in the amount of the magnetic flux which reaches the magnetic fluid retaining gap portion between the shaft and the magnetic fluid retainer, since when mounted on a magnetic housing the major part of the magnetic flux produced by the magnet is allowed to return through the housing.

Figure 4:
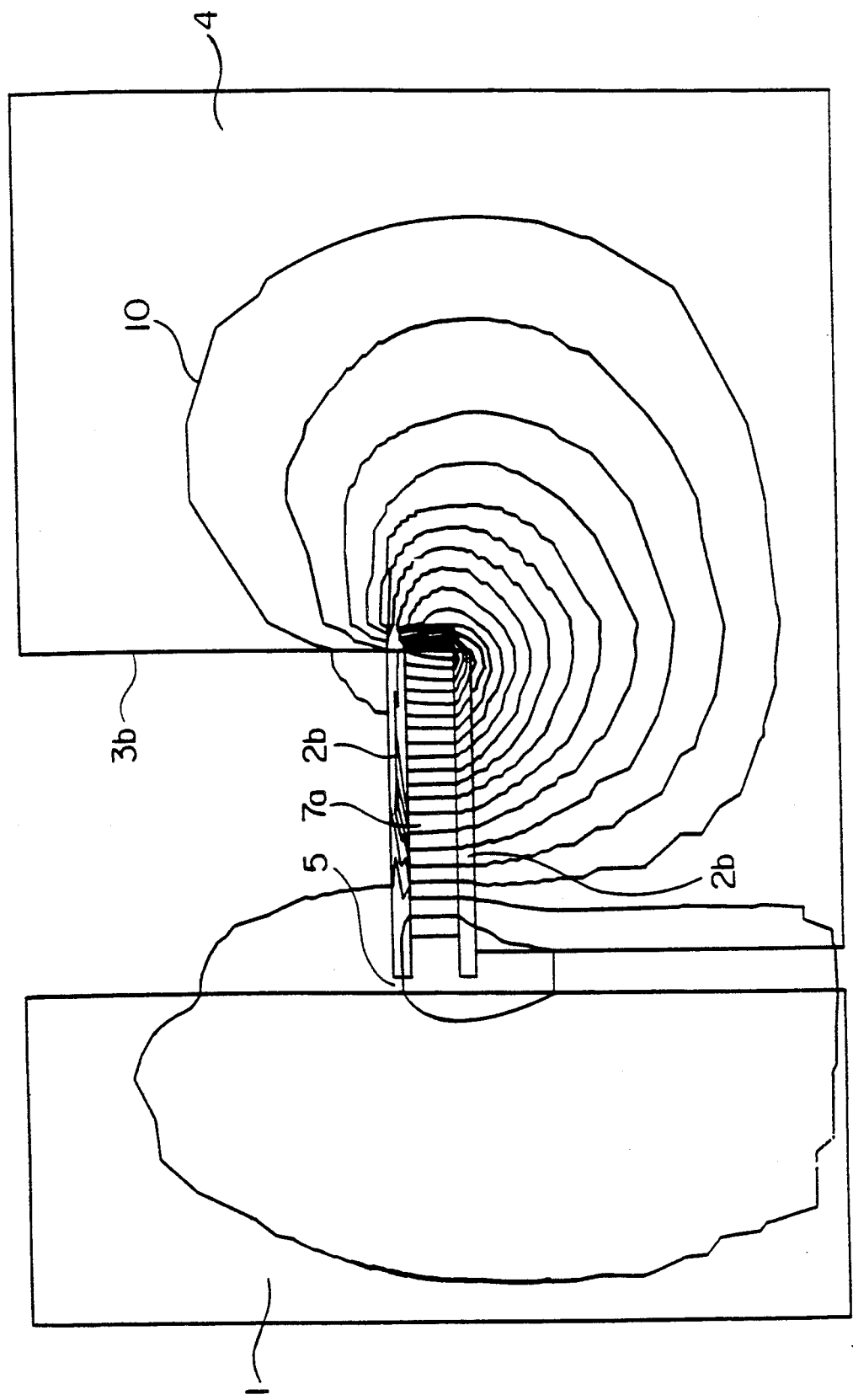
FIG. 4 is a magnetic flux flow chart showing the results of magnetic analysis by computer simulation of the conventional magnetic fluid retainer mounted on magnetic housing.
Figure 5:
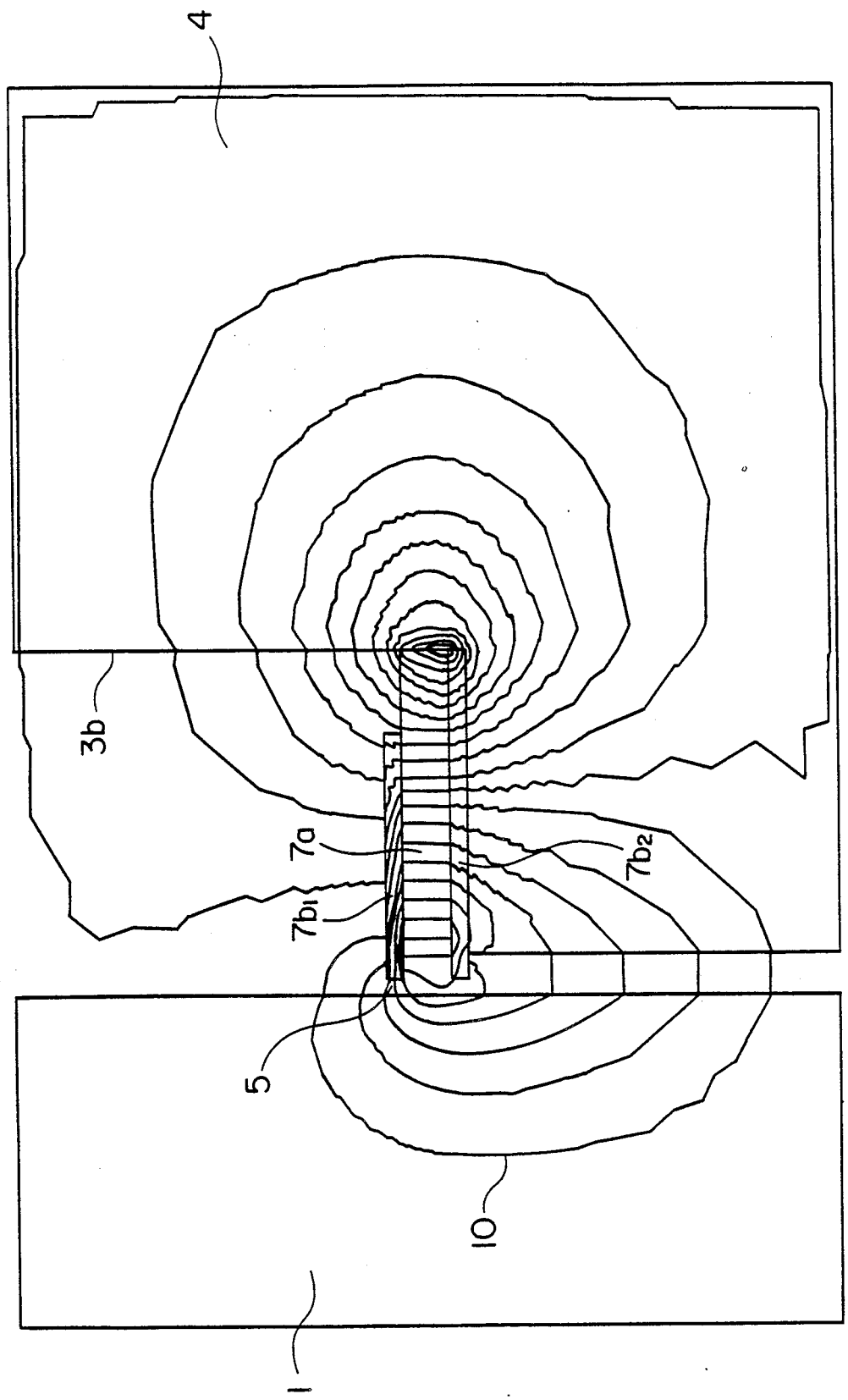
FIGS. 5, 7 and 9 are magnetic flux flow charts showing the re of magnetic analyses by computer simulation of magnetic fluid retainers of the invention, mounted on magnetic housing.

These phenomena were analyzed by magnetic field analysis simulations using a computer. The results in exemplary cases are shown in FIGS. 4 and 5. More specifically, as clear from FIG. 4, the magnetic flux 10 produced by the magnet 7a of the shaft sealer of the conventional construction mostly flows toward the magnetic housing 4 through the yoke, so that the flux to the magnetic fluid retaining gap portion 5 (i.e., the gap space formed between the rotational shaft 1 and the yoke 7b) is reduced to an extremely small amount.

In contrast, in case of Specimen No. 3 according to the invention, the magnetic flux 10 produced by the magnet 7a mainly flows toward the shaft 1 through the smaller yoke 7b$_1$ as shown in FIG. 5, with a larger amount of magnetic flux passing through the magnetic fluid retaining gap 5. It will be seen that, in this case, the flow of magnetic flux is blocked at a broad gap space which is formed between the smaller yoke 7b$_1$ and the inner periphery 3b of the stepped portion which has a diameter almost same as the outer diameter of the larger yoke 7b$_2$.

Figure 6:
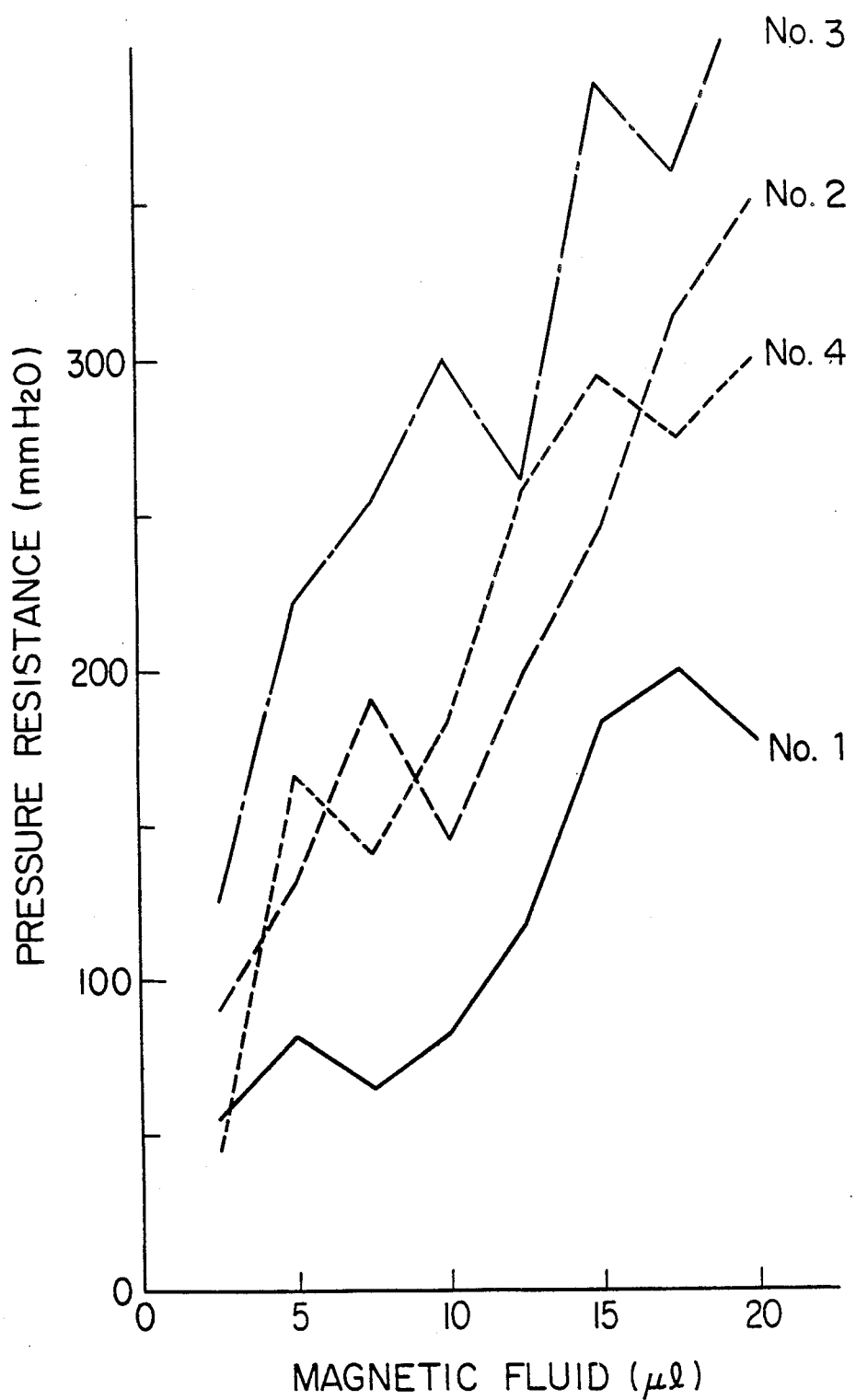
FIGS. 6 and 8 are diagrams of the amount of magnetic fluid injection versus pressure resistance in Examples of the invention and Comparative Example.

Plotted in FIG. 6 are variations in pressure resistance of the respective fluid retainers of Table 1, which were mounted on a magnetic housing and injected with a varying amount of magnetic fluid. It will be seen from FIG. 6 that, although there is an unstable zone wherein pressure resistance comes down depending on the amount of magnetic fluid injection, the pressure resistance with more amount of magnetic fluid was improved in proportion to the amount of magnetic fluid injection. As clear therefrom, Specimens Nos. 2, 3 and 4, representing the magnetic fluid retainer of the invention, excelled Specimen No. 1 of the conventional magnetic fluid retainer, exhibiting a higher pressure resistance for any amount of magnetic fluid injection.

EXAMPLE 2

As another example, the size of the magnet in the shaft sealer construction shown in FIG. 1 was varied.

To serve as the magnet 7, there were prepared annular ferrite bonded magnets with outer diameters as shown in Table 2, an inner diameter of 9.4 mm and a thickness of 0.6 mm. As the yoke of larger outer diameter, there were prepared annular yokes of 16.5 mm in outer diameter, 8.4 mm in inner diameter and 0.2 mm in thickness.

As the smaller yoke, there were prepared annular yokes with outer diameters as shown in Table 2, an inner diameter of 8.4 mm and a thickness of 0.2 mm.

TABLE 2

| Status | Specimen No. | Magnet Outer Diam. (mm) | Smaller Outer Diam. (mm) | Pressure Resistance | |
|---|---|---|---|---|---|
| | | | | Mounted in Non-magnetic housing | Mounted in magnetic housing |
| Comparative Ex. | 1 | 16.5 | 16.5 | 242 | 65 |
| Invention | 5 | 15.5 | 15.5 | 182 | 163 |
| | 6 | 14.5 | 14.5 | 132 | 205 |

TABLE 2-continued

| Status | Specimen No. | Magnet Outer Diam. (mm) | Smaller Outer Diam. (mm) | Pressure Resistance | |
|---|---|---|---|---|---|
| | | | | Mounted in Non-magnetic housing | Mounted in magnetic housing |
| | 7 | 13.5 | 13.5 | 95 | 128 |

Note: Outer Diameters of larger yokes were all 16.5 mm.

Next, the respective yokes were secured to the opposite axial end faces of the magnet substantially in concentric relation by the use of a cyanoacrylate-base adhesive to obtain magnetic fluid retainers according to the invention (Specimen Nos. 5 to 7).

After fitting a shaft of 8 mm, each one of these magnetic fluid retainers was mounted on a magnetic housing, measuring the pressure resistance of the magnetic fluid which was supplied to the gap portion between the magnetic fluid retainer and the shaft in an amount of 7.5 microliters. The results are shown in Table 2.

As stated in Example 1, the magnetic fluid retainer of Comparative Example exhibits a high pressure resistance when mounted on a non-magnetic housing, but its pressure resistance drops markedly to a practically unusable level when mounted on a magnetic housing since the magnetic flux of the magnetic fluid retainer tends to return through the housing, reducing the amount of the magnetic flux to the magnetic fluid retaining gap portion between the shaft and the magnetic fluid retainer.

Conversely, in case of the magnetic fluid retainer according to the invention, the drop in pressure resistance is very small even when the retainer is mounted on a magnetic housing.

This is because, even when the magnetic fluid retainer of the invention is mounted on a magnetic housing, the gap space of 0.5 mm or larger which exists between a yoke and the housing increases the reluctance at that portion, suppressing the return through the housing of the magnetic flux produced by the magnet. Consequently, it becomes possible to increase relatively the amount of magnetic flux to the magnetic fluid retaining gap portion between the shaft and the magnetic fluid retainer, permitting to realize a shaft sealer of excellent characteristics.

Figure 7:
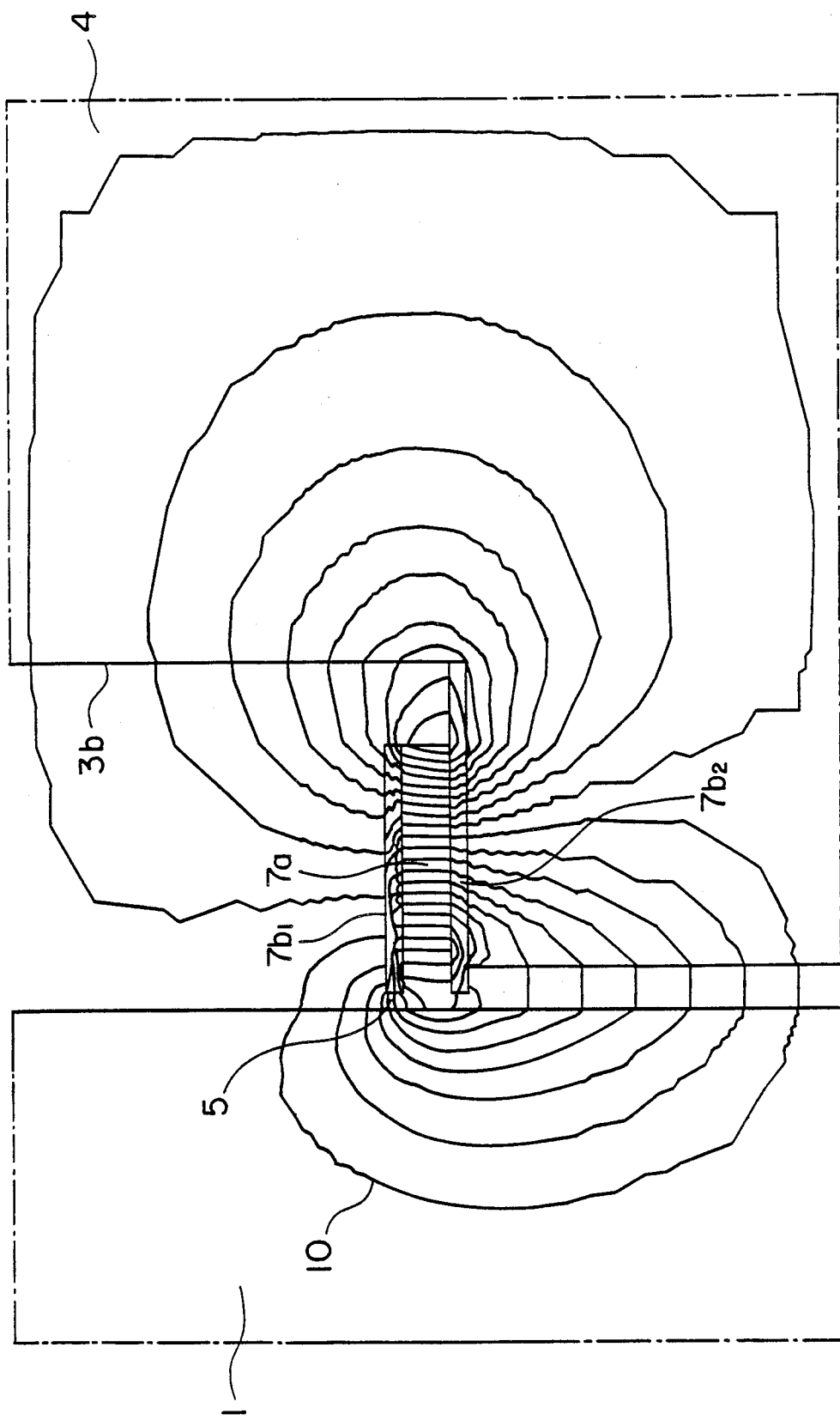

These phenomena are clearly seen in the results of computerized magnetic field analysis shown in FIG. 7. That is, in FIG. 7, the magnetic flux 10 produced by the magnet 7a mostly flows toward the shaft 1 through the yoke $7b_1$, with a large amount of magnetic flux passing across the magnetic fluid retaining gap portion 5. This owes to the provision of the large magnetic gap which is formed between the yoke $7b_1$ of smaller outer diameter and the inner periphery 3b of the stepped portion substantially equal to the outer diameter of the larger yoke $7b_2$, the gap increasing the reluctance at that portion to block the flow of magnetic flux.

Figure 8:
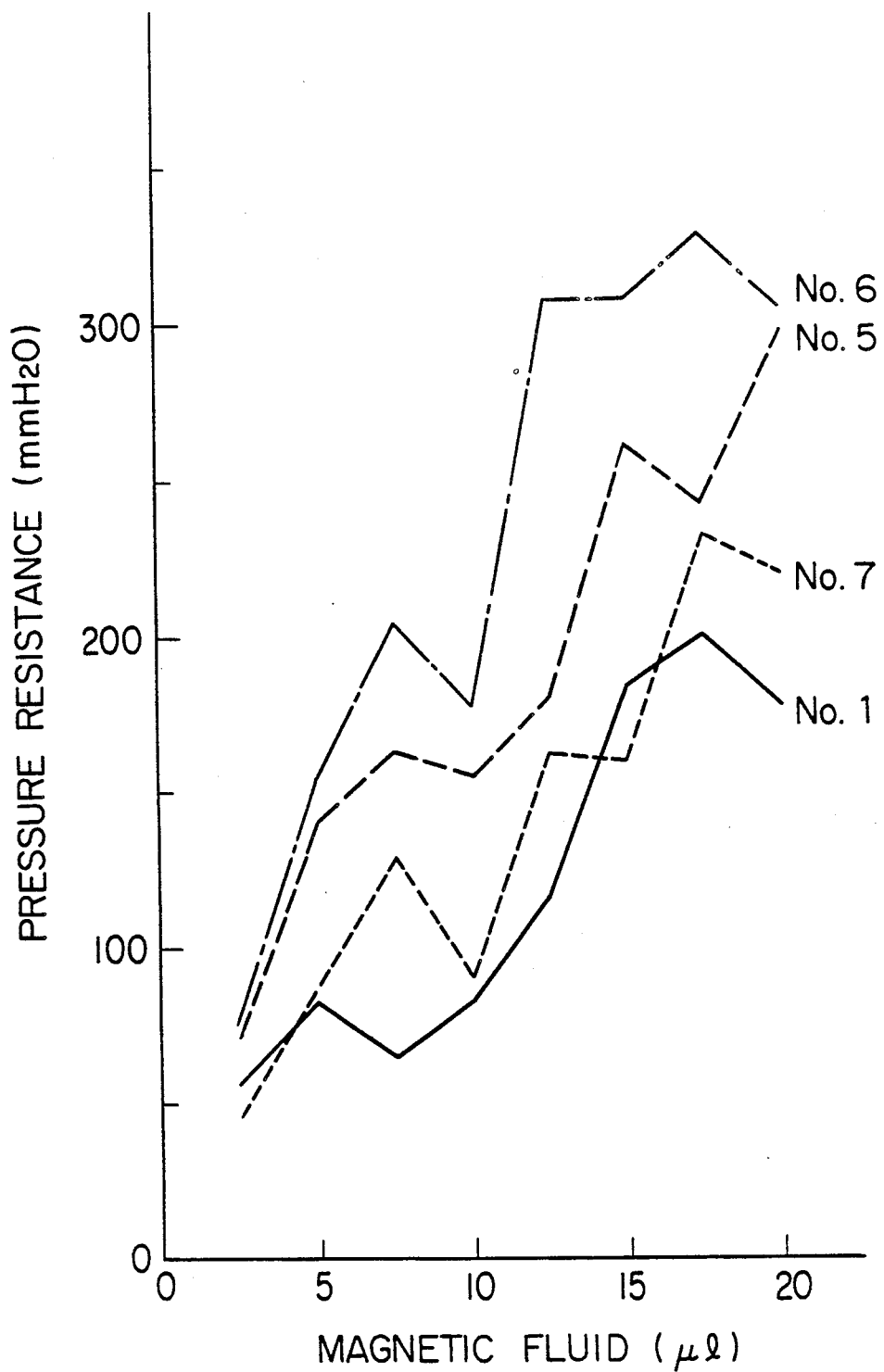

Shown in FIG. 8 are variations in pressure resistance of the magnetic fluid retainers of Table 2, which were mounted in a magnetic housing and supplied with a varying amount of magnetic fluid. As seen in FIG. 8, Specimens Nos. 5 to 7 of the magnetic fluid retainer according to the invention all show a higher pressure resistance than Specimen No. 1 of the conventional magnetic fluid retainer. Especially, Specimen No. 7 according to the invention exhibits a pressure resistance equivalent to or higher than that of Comparative Example even though its magnet is about half in volume, indicating that the magnetic fluid retainer of the present invention is extremely effective for attaining reductions in size and improvements in performance of the shaft sealer.

EXAMPLE 3

Now a further example of the invention is described with reference to FIG. 2.

In this example, of the two yokes $7b_1$ and $7b_2$ on the opposite sides of the bond magnet 7a, the yoke $7b_1$ which is abutted against the bottom surface 3a of the stepped portion 3 in the housing 4 has a smaller outer diameter, and a non-magnetic member 6 of a synthetic resin material or the like is interposed between the yoke $7b_1$ and the stepped portion 3, forming a substantial magnetic gap between the yoke $7b_1$ and the magnetic housing 4 to prevent leaks of magnetic flux to the housing 4 from circumferential portions of the magnetic fluid retainer 2. The yoke $7b_2$ of larger outer diameter, which is located on the opposite side of the magnet has its outer periphery fitted in the stepped portion 3 of the magnetic housing 4 and is fixedly secured to the inner peripheral surface 3b of the housing. In the same manner as in Example 1, a magnetic fluid 3 is retained between the shaft 1 and yokes 7b and $7b_2$.

Figure 2:
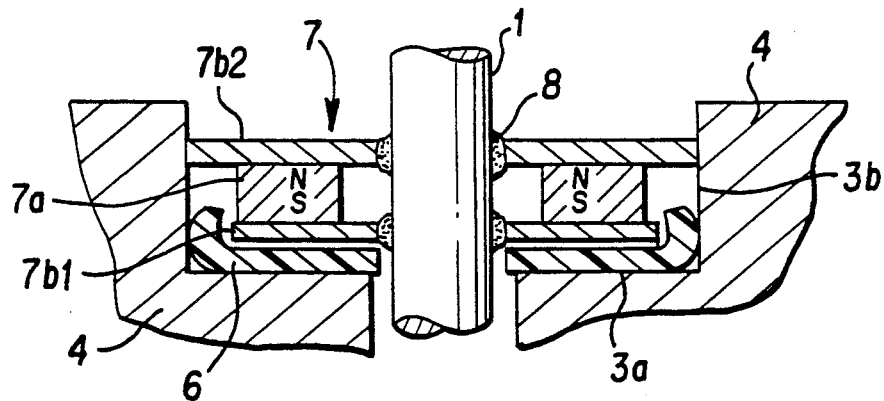
FIG. 2 is a fragmentary sectional view of major components in another embodiment of the invention.
Figure 3:
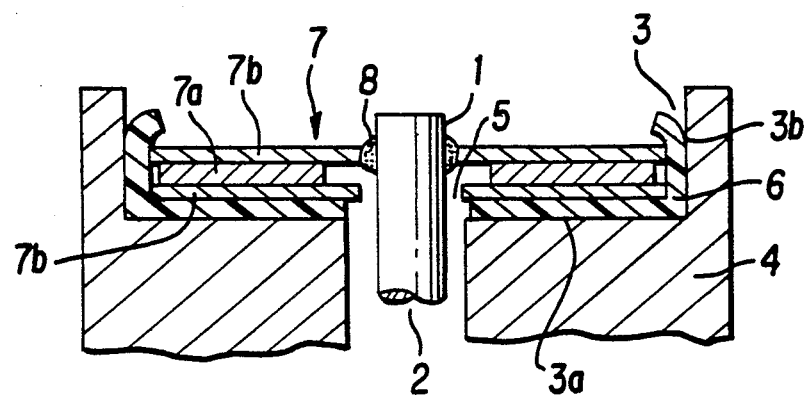
FIG. 3 is a fragmentary sectional view of major components of a conventional shaft sealer.

FIG. 2 shows that the outside diameter of the magnet 7a is smaller than the outside diameter of the smaller yoke, but the outside diameter of the magnet may be larger than the outside diameter of the smaller yoke or the same as the outside diameter of the larger yoke to provide the advantage of this invention as discussed in Example 1.

Although the non-magnetic member 6 is extended as far as the outer periphery of the yoke $7b_1$ in FIG. 2, it is not necessarily required to be extended to that portion. In case of the sealer construction incorporating a non-magnetic member between the smaller yoke and the bottom surface of the stepped portion as shown in FIG. 2, the centering is effected through the large-diameter yoke without relying on the smaller-diameter yoke, so that there is an advantage that deformation of the non-magnetic member is unlikely to cause eccentric deviation.

Annular ferrite bonded magnets with dimensions of 16.5 mm in outer diameter, 9.4 mm in inner diameter and 0.6 mm in thickness were prepared to serve as the magnet 7a. Annular yoke plates with dimensions of 16.5 mm in outer diameter, 8.4 mm in inner diameter and 0.2 mm in thickness were prepared from magnetic stainless steel to serve as the large-diameter yoke $7b_2$. Further, three kinds of annular yoke plates with outer diameters as shown in Table 3 below, an inner diameter of 8.4 mm and a thickness of 0.2 mm were prepared as the small-diameter yoke $7b_1$.

Figure 9:
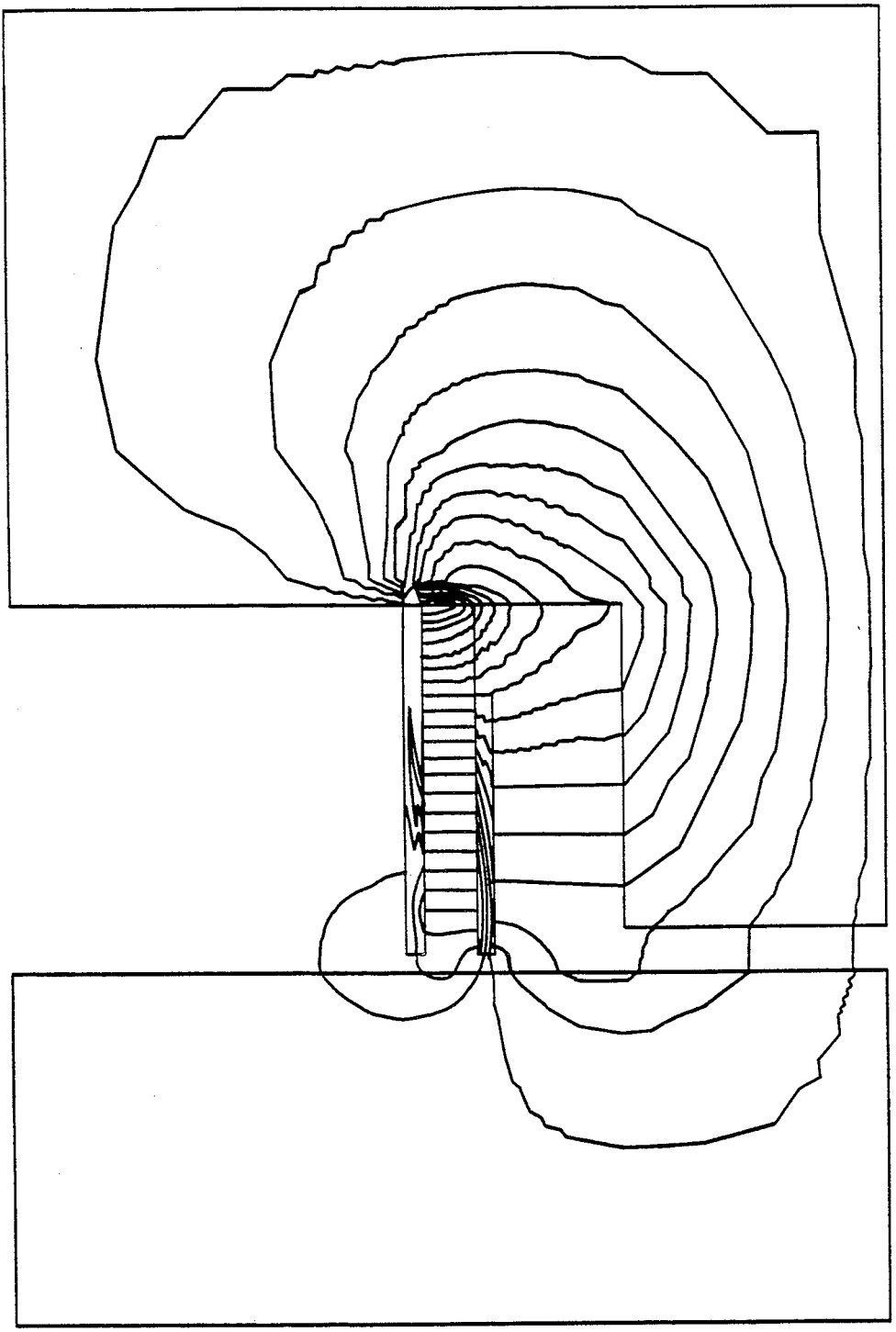

Table 3 also presents the pressure resistances measured for the Specimen No. 8 construction for both non-magnetic and magnetic housings, in comparison with the corresponding values of the Comparative Example described earlier. FIG. 9 shows a computer simulation of the magnetic field surrounding the Specimen No. 8 construction.

TABLE 3

| Status | Specimen No. | Outer Diam. of Smaller Yoke (mm) | Pressure resistance (mm H$_2$O) | |
|---|---|---|---|---|
| | | | Mounted in Non-magnetic Housing | Mounted in magnetic Housing |
| Comparative Example | 1 | 16.5 | 242 | 65 |
| Invention | 8 | 14.5 | 132 | 252 |

Although the foregoing examples employs bonded magnets which are formed by mixing ferrite magnet powder, samarium cobalt magnet powder or neodymium iron boron magnet powder into nylon followed by magnetization. However, sintered or other types of magnets are applicable in the present invention in place of the bonded magnets.

It will be appreciated from the foregoing description that, in the magnetic fluid retainer according to the present invention or the shaft sealer incorporating such retainer, one of the yokes on the opposite sides of the magnet is formed in a reduced outer diameter to provide a spacing between the small-diameter yoke and the magnetic housing to act as a reluctance preventing escape of the magnetic flux to the outside. It manifests excellent effects especially when applied to a shaft which is passed through part of a magnetic housing. When designed appropriately, the magnetic force at the inner periphery of the shaft hole of the magnetic fluid retainer is sufficiently strong, retaining the magnetic fluid securely with a force excelling even the magnetic force of the conventional magnetic fluid retainer which is mounted in a non-magnetic housing. Besides, adjacent devices are free from the adverse effects of the magnetic flux which would otherwise leak to the outside through the magnetic housing. Moreover, in addition to an economical advantage that the amounts of the materials to be used for the yokes and magnet can be reduced, the invention contributes to the reduction of weight of the shaft sealer.

What is claimed is:

1. Apparatus for sealing a magnetic shaft comprising: a magnetic housing having a shaft-receiving hole and a stepped portion at least at one end of said shaft-receiving hole of a diameter sufficiently greater than the outer diameter of the shaft to be fitted therein; a magnetic fluid retainer having a shaft hole for passing therethrough the magnetic shaft and fittingly mounted in said stepped portion of said housing; and a magnetic fluid retained between said magnetic shaft and said magnetic fluid retainer; said magnetic fluid retainer being constituted by at least one pair of magnetic yokes and an axially magnetized permanent magnet gripped between said yokes, one of said yokes having a smaller outer diameter than the other to form a broader gap space between the yoke of smaller outer diameter and the inner periphery of said stepped portion of said housing than between the yoke of greater outer diameter and said stepped portion of said housing, wherein said yoke having the greater outer diameter abuts said housing periphery, the apparatus further including a non-magnetic member separating said yoke having the small outer diameter from said housing.

* * * * *

UNITED STATES PATENT AND TRADEMARK OFFICE
CERTIFICATE OF CORRECTION

PATENT NO. : 4,989,885
DATED : February 5, 1991
INVENTOR(S) : Masao IWATA et al.

It is certified that error appears in the above-indentified patent and that said Letters Patent is hereby corrected as shown below:

On title page, item [73] insert —Hitachi Metals International, Ltd., Purchase, New York—.

Signed and Sealed this

Eighth Day of August, 1995

Attest:

BRUCE LEHMAN

Attesting Officer

Commissioner of Patents and Trademarks